(12) United States Patent    (10) Patent No.:    US 6,352,127 B1
Yorde                         (45) Date of Patent:    Mar. 5, 2002

(54) ELBOW ATTACHMENT

(75) Inventor: Rick Yorde, Danville, OH (US)

(73) Assignee: Applied Innovation and Manufacturing Ltd., Danville, OH (US)

( * ) Notice: Subject to any disclaimer, the term of this patent is extended or adjusted under 35 U.S.C. 154(b) by 0 days.

(21) Appl. No.: 09/061,756

(22) Filed: Apr. 16, 1998

(51) Int. Cl.$^7$ .............................................. B25B 21/00
(52) U.S. Cl. .................... 173/216; 173/29; 173/217; 81/57.13; 81/57.29; 408/239 A
(58) Field of Search ................. 173/216, 217, 173/170, 29, 46; 81/57.29, 57.13, 57.11, 57.28, 177.1, 177.85; 74/417; 408/20, 239 A

(56) References Cited

U.S. PATENT DOCUMENTS

| | | | | |
|---|---|---|---|---|
| 2,155,082 A | * | 4/1939 | Decker | |
| 2,780,942 A | * | 2/1957 | Babcock | |
| 2,900,856 A | * | 8/1959 | Maier | |
| 3,901,098 A | * | 8/1975 | Jinkins | 173/216 |
| 4,332,147 A | * | 6/1982 | Grech | 173/216 |
| 5,709,136 A | * | 1/1998 | Frenkel | 81/57.29 |
| 5,863,159 A | * | 1/1999 | Lasko | |
| 6,089,331 A | * | 7/2000 | Christ | 173/216 |

* cited by examiner

Primary Examiner—Scott A. Smith
(74) Attorney, Agent, or Firm—Dillis V. Allen, Esq.

(57) ABSTRACT

An elbow or right angle attachment for a power tool converts the torque of the power tool drive shaft to a transverse shaft which is supported by a housing to extend angularly with respect to the drive shaft. A pinion gear is mounted on the power tool drive shaft and a face gear is mounted on the transverse shaft interiorly of the housing. The face gear and pinion gear engage one another when the elbow attachment housing is mounted to the power tool housing. The pinion gear has teeth with a face width which allows for variability in the precise mounting of the elbow attachment housing to the power tool housing, without any significant resultant detriment to operation of the device.

20 Claims, 3 Drawing Sheets

ELBOW ATTACHMENT

FIELD OF THE INVENTION

The present invention pertains to right angle or elbow attachments for power driven tools, and more particularly pertains to elbow attachments for mounting to power tools to drive an output shaft perpendicular to the drive shaft of the power tool.

BACKGROUND OF THE INVENTION

Several elbow attachments for use with power tools are currently available in the marketplace; however, each of the presently available elbow attachments suffers a significant shortcoming. Currently available elbow attachments are of two general types.

One type of commonly employed elbow attachment utilizes a pair of bevel gears to transfer the torque from the drive shaft of the power tool to the transverse shaft of the elbow attachment, which transverse shaft is supported by the elbow attachment housing perpendicular to the power tool drive shaft. That is, a first bevel gear is mounted to the drive shaft of the power tool, and a second bevel gear is mounted on the transverse shaft of the elbow attachment. The first and second bevel gears are disposed such that when the elbow attachment is mounted to the power tool, the first and second bevel gears mesh to effect transfer of the torque from the power tool drive shaft to the transverse shaft of the elbow attachment. A particular shortcoming of this type of elbow attachment is that it is necessary for the two bevel gears to be accurately positioned with respect to one another for the gears to properly mesh. Hence, this arrangement does not allow for any significant variability in the positions of the two bevel gears, and therefore it does not allow for any variability in the precise position at which the elbow attachment is mounted on the power tool. Since it is difficult to provide such high precision in the mounting of the elbow attachment to the power tool housing without increased complexity of design and/or cost, elbow attachments which utilize a pair of bevel gears are subject to improper meshing of the bevel gears and accelerated wear, as well as increased noise.

In another type of commonly employed elbow attachment, the housing of the elbow attachment supports both a longitudinal shaft and a transverse shaft, with the shafts supporting respective gears which mesh with one another to transfer the torque from the longitudinal shaft to the transverse shaft. The longitudinal shaft is engageable with the drive shaft of the housing and is disposed for rotation together with the drive shaft about the drive shaft axis. The transverse shaft extends perpendicular to the longitudinal shaft. The longitudinal and transverse shafts are maintained in their respective positions within close tolerance, such as by their support on respective bearings, and therefore the gears maintain good meshing. A particular shortcoming of this type of elbow attachment is its requirement of the longitudinal shaft and its associated bearings, which add significantly to the cost and size of the device.

Accordingly, there is a need for an elbow attachment which allows for some variability in its engagement with a power tool housing while still maintaining good meshing of the gears which transfer the torque to the transverse shaft, and which does not require a second shaft and associated bearings in addition to the transverse shaft to allow for a lower cost product.

SUMMARY OF THE INVENTION

In accordance with the present invention, an elbow attachment is provided for use with power tools having a housing which supports a drive shaft which is rotary about its longitudinal axis and which protrudes externally of the power tool housing at a driving end of the housing.

A pinion gear is detachably mountable directly on the drive shaft of the power tool at a location externally of the power tool housing and at a predetermined distance from the driving end of the housing, with the pinion gear having gear teeth with faces of predetermined face width which extend substantially parallel with the longitudinal axis of the power tool drive shaft. An elbow member is provided, comprising an elbow member housing having a power tool engaging end which is engageable with the power tool housing adjacent its driving end, with a transverse shaft having a longitudinal axis and supported by the elbow member housing to be substantially perpendicular to the longitudinal axis of the drive shaft of the power tool upon engagement of the elbow member housing with the power tool housing, with the transverse shaft having a tool engaging end disposed externally of the housing for engaging a tool, and with a face gear having gear teeth which extend substantially parallel with respect to the longitudinal axis of the transverse shaft, with the face gear being mounted on the transverse shaft at a predetermined position at which the teeth of the face gear are engageable with the teeth of the pinion gear when the elbow member housing is engaged with the power tool housing.

BRIEF DESCRIPTION OF THE DRAWINGS

In the drawings, wherein like elements are referenced alike.

DETAILED DESCRIPTION OF THE PREFERRED EMBODIMENTS

Figure 2:
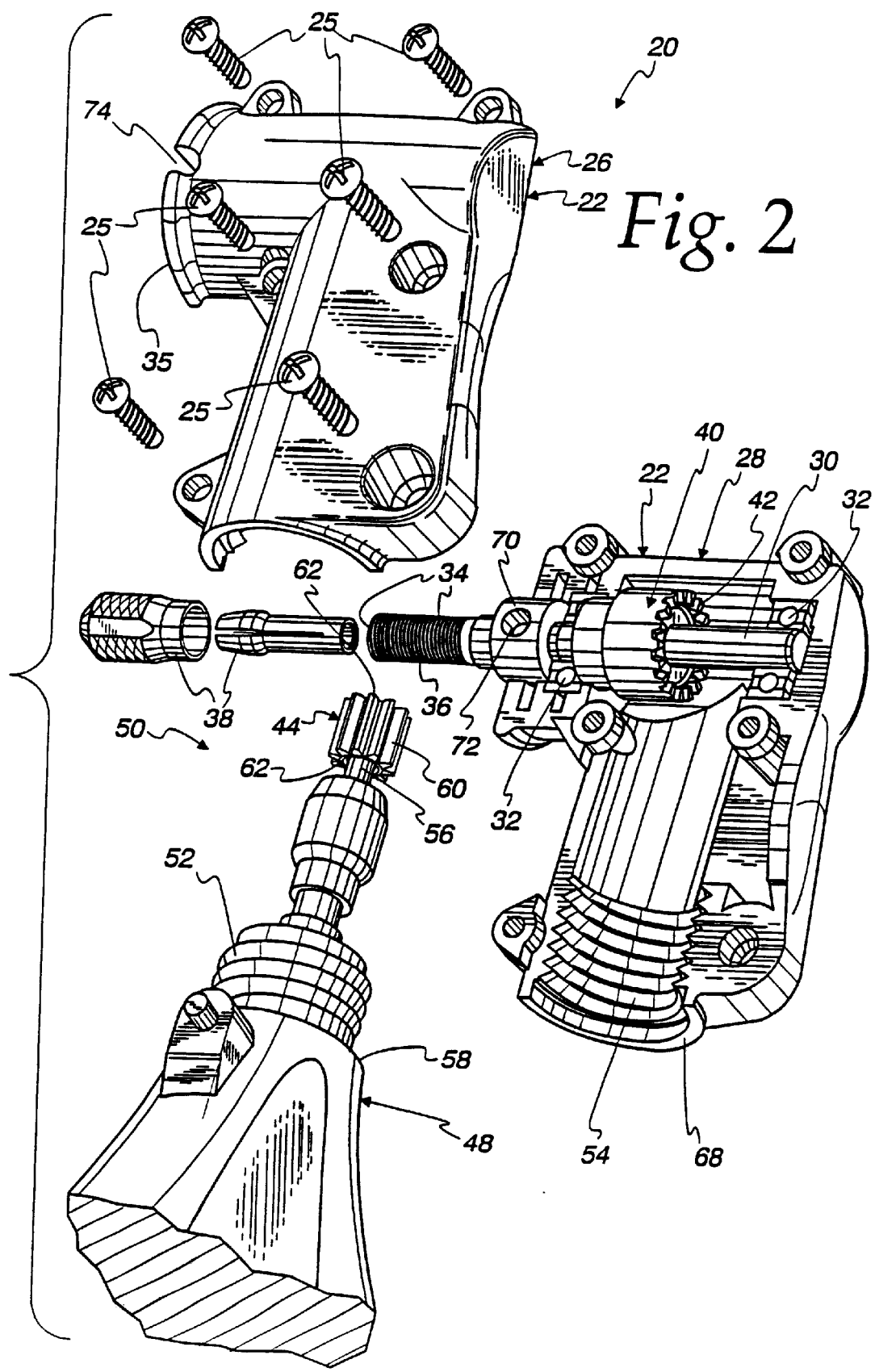
FIG. 2 is an exploded, perspective view of an elbow attachment embodying various features of the present invention.
Figure 3:
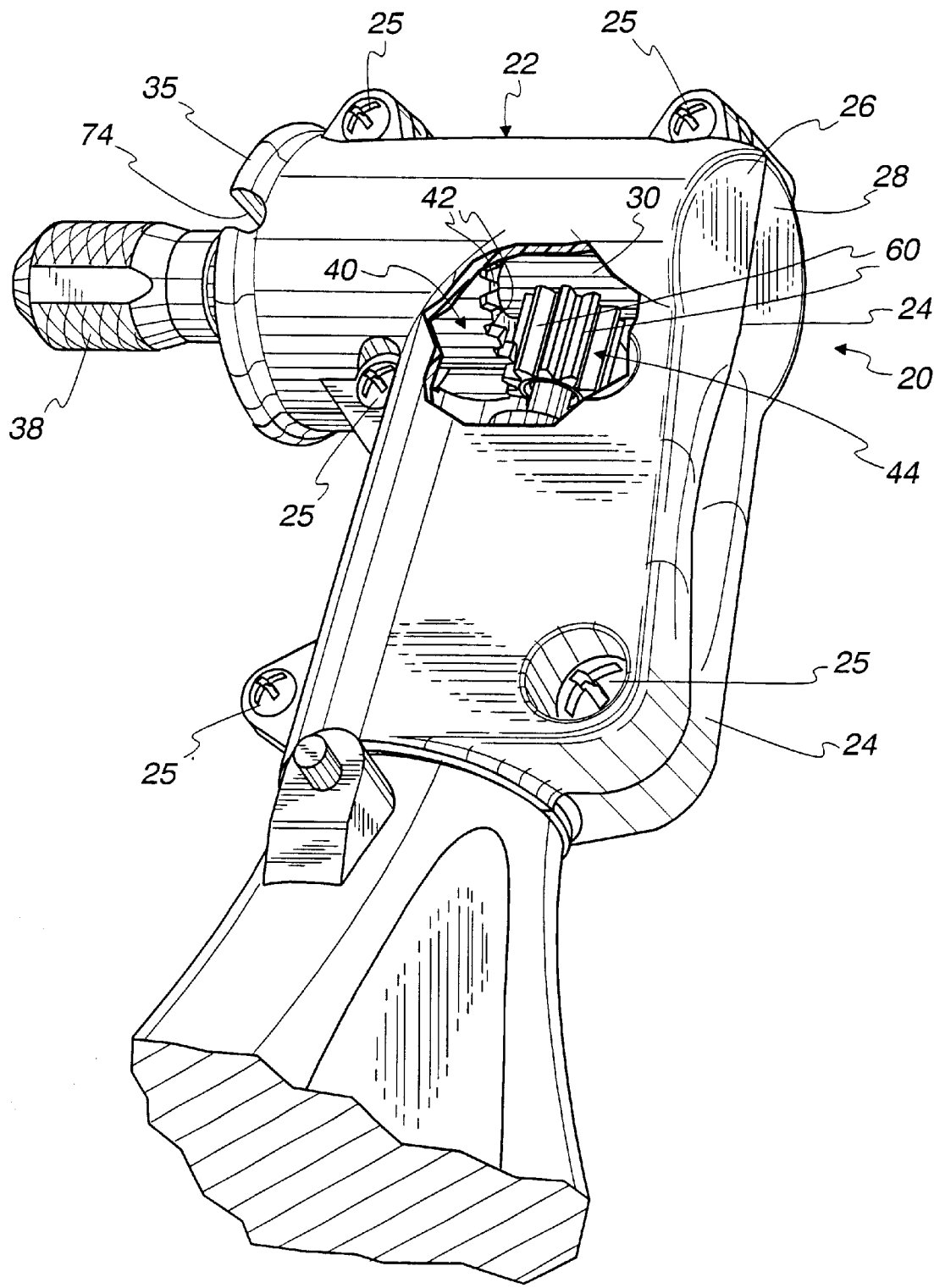
FIG. 3 is a perspective view of the elbow attachment of FIG. 2 mounted to a power tool housing, with a cutaway to illustrate the engagement of the pinion and face gears.

An elbow attachment embodying various features of the present invention is illustrated in FIGS. 2 and 3 and referred to generally by reference numeral 20. The elbow attachment 20 has an elbow attachment housing 22 which preferably has a split line 24 to define a first housing portion 26 and a second housing portion 28 which are engageable with one another along the split line 24. Screws 25 may be employed to securely hold the two housing portions 24 and 26 together. With reference to FIG. 2, the housing 22 supports a transverse shaft 30 on a pair of bearings 32 for low friction rotation of the transverse shaft 30 about its longitudinal axis. The transverse shaft 30 has a tool engaging end 34 which extends externally of the housing 22, and which has means for engaging a tool bit. In the illustrated embodiment, a threaded portion 36 is provided adjacent the tool engaging end 34 of the transverse shaft 30 for engaging a collet and collet nut assembly 38; however, as will be readily apparent to those skilled in the art, any of a wide variety of arrangements for engaging tool bits are currently well known and employable with the elbow attachment 20 of the present invention, and the invention is in no way limited to transverse shafts having threaded portions nor limited to use with collets.

The elbow attachment housing 22 is engageable with a power tool housing 48 of a power tool 50. In the illustrated embodiment, the power tool housing 48 has an external threaded portion 52 which is threadably engageable with an internally threaded portion 54 of the elbow attachment housing 22 to detachably secure the elbow attachment 20 to the power tool 50.

A pinion gear 44 is securely and detachably mountable directly on the drive shaft 56 at a location externally of the power tool housing 48 and at a predetermined distance from the driving end 58 of the power tool housing 48. The pinion gear 44 has gear teeth 60 with faces which extend substantially parallel with one another and with the longitudinal axis of the power tool drive shaft 56. Preferably, the pinion gear 44 has a plurality of teeth 60 extending radially outwardly and uniformly angularly spaced.

A face gear 40 is secured on the transverse shaft 30 internally of the elbow member housing 22, for rotation together with the transverse shaft 30. The face gear 40 has teeth 42 on one of its sides which extend substantially parallel to the longitudinal axis of the transverse shaft 30. The face gear 40 is secured to the transverse shaft 30 at a location such that the teeth 60 of the pinion gear 44 mesh with the teeth 42 of the face gear 40 upon and throughout engagement of the elbow member 20 with the power tool, as best seen in FIG. 3.

In accordance with one aspect of the present invention, the elbow attachment 20 of the present invention does not require great accuracy in the distance of the face gear 40 toward or away from the driving end 59 of the power tool 48, hence allowing for inaccuracy or variability in the mounting of the elbow attachment housing 22 to the power tool housing 48, particularly allowing for inaccuracy in the longitudinal direction of the output shaft axis, without any significant detrimental effect on the proper operation and longevity of the device. This beneficial aspect of the elbow attachment of the present invention is attributable to the fact that the faces of the pinion gear teeth 60 all extend parallel to the power tool axis 56 and extend to a predetermined face width or depth. The elbow attachment housing 22 is configured such that the teeth 42 of the face gear 40 mesh with the teeth 60 of the pinion gear 44 at a location spaced from either end 62 of the pinion gear 44 when the elbow attachment 20 is fully mounted on the power tool 50. Since the profiles of the teeth 60 of the pinion gear all remain equal throughout the depth of the pinion gear, it does not make any difference at what point, intermediate the ends 62 of the pinion gear teeth 60, the teeth 42 of the face gear 40 mesh with the teeth 60 of the pinion gear 44. Hence, the elbow attachment housing 22 is preferably configured such that the teeth 42 of the face gear 40 mesh with the teeth 60 of the pinion gear 44, when the elbow attachment is fill and ideally mounted on the power tool 50, at a location sufficiently spaced from the end 62 of the pinion gear 44 which faces the power tool 50, such that improper mounting of the elbow attachment or unintentional loosening of the elbow attachment from the power tool during usage will not result in detrimental operation of the device. For instance, with the threaded engagement of the elbow attachment with the power tool as in the illustrated embodiment, incomplete screwing down of the elbow attachment housing 22 or slight unscrewing of the elbow attachment housing 22 will result in the face gear teeth 42 engaging with the pinion gear teeth 60 at a location further away from the power tool 48, but without any significant affect on the operation of the elbow attachment 20. Similarly, over screwing of the elbow attachment housing 22, such as attributable to wearing down of the engaging end 68 of the elbow attachment housing 22, will result in the face gear teeth 42 engaging with the pinion gear teeth 60 at a location closer toward the power tool 50.

The aforementioned advantageous aspect of the elbow attachment of the present invention allows for the use of means for engaging the elbow attachment to the power tool which are significantly less expensive and/or complex than is required with prior art elbow attachments which require greater accuracy and precision in the engagement of its gears. Likewise, the position of the pinion 44 on the drive shaft 56 does not have to be as accurate with the elbow attachment of the present invention as would be required were a pair of bevel gears or the like employed, which require greater accuracy and precision in the engagement of its gears.

Figure 1:
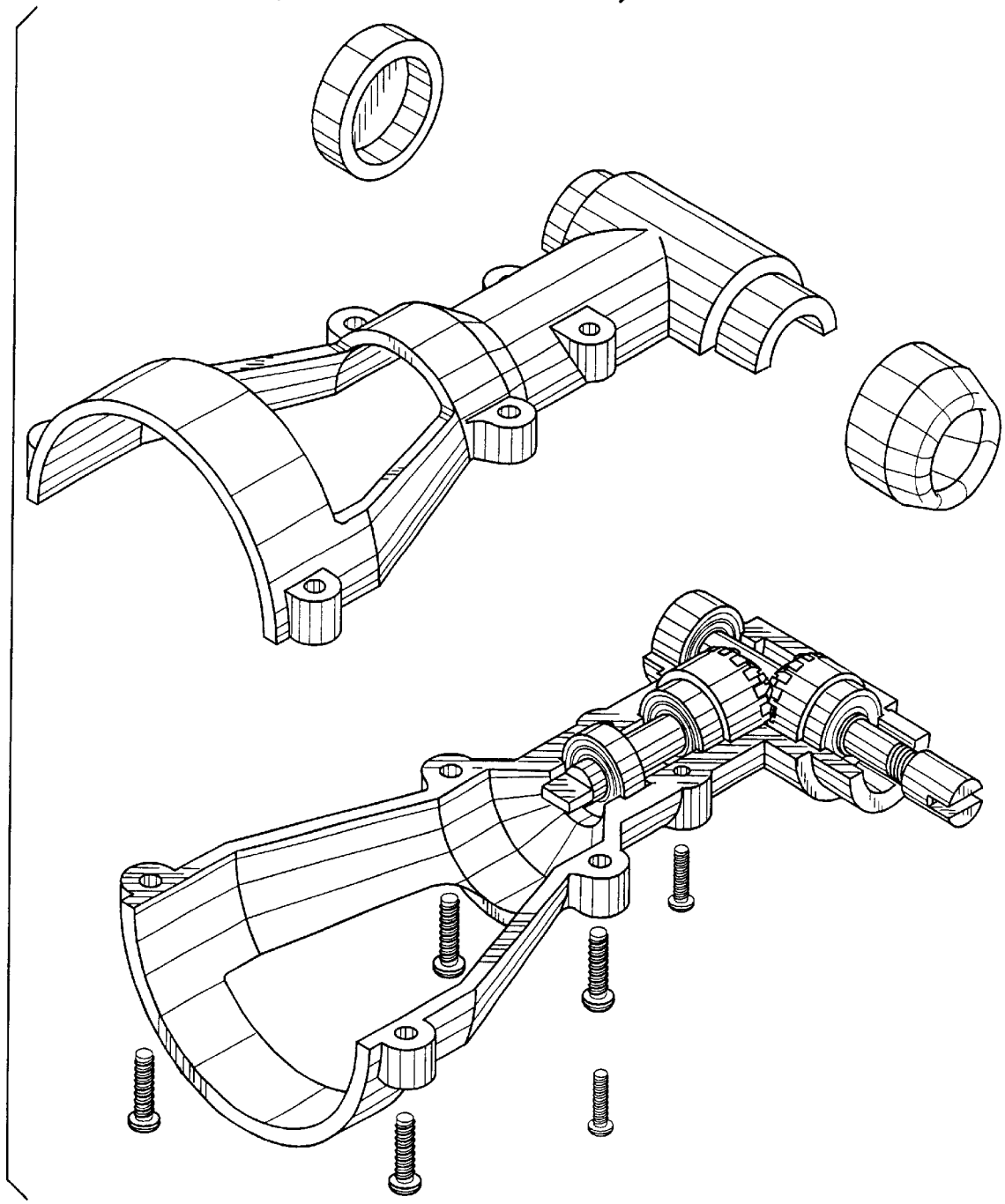
FIG. 1 is an exploded, perspective view of a prior art elbow attachment which utilizes a longitudinal shaft in addition to a transverse shaft.

With reference to the prior art elbow attachment of FIG. 1, it will now be appreciated that since the elbow attachment 20 of the present invention employs only one shaft mounted on bearings, rather than two shafts mounted on respective bearings as in the prior art designs of the type illustrated in FIG. 1, still farther cost savings in the production of the elbow attachment 20 of the present invention may be achieved relative to production of prior art elbow attachments.

The transverse shaft 30 has an integral enlarged region 70 with an aperture 72 therethrough, and the housing has a notch 74 through which an implement may be inserted into the aperture 72 when it is rotatably aligned with the notch 74, by which the transverse shaft 30 may be held stationary against rotation during engagement and disengagement of tool bits.

A particularly advantageous feature of the present invention is that it allows for utilization of the power tool's already-existing tool bit holder for the pinion gear, such that no separate mechanism for securing the pinion gear to the drive shaft is required. That is, the elbow attachment lends itself to retrofitting onto a wide range of currently existing power tools, with the pinion gear mounted to the drive shaft via the standard tool bit mounting mechanism already provided on the power tool.

Though the invention is described herein by way of preferred and illustrated embodiments, the invention is broader in scope than any specific embodiments, and many variations and modifications will be readily apparent to those skilled in the art. All such modifications and variations are within the scope and spirit of the present invention which is set forth in the accompanying claims.

What is claimed is:

1. An elbow attachment kit for use with a power tool having a housing which supports a drive shaft which is rotary about its longitudinal axis and which protrudes externally of the power tool housing at a driving end of the housing, the attachment kit comprising: a pinion gear adapted to be detachably mounted on the drive shaft at a location externally of the power tool housing and at a predetermined distance from the driving end of the housing, said pinion gear having gear teeth with faces of predetermined face width which extend substantially parallel with the longitudinal axis of the power tool drive shaft, an elbow member, including an elbow member housing having a power tool engaging end which is engageable with the power tool housing adjacent its driving end, said elbow member housing having a housing portion surrounding the pinion gear with an opening therein sufficiently large to freely receive and allow the pinion gear to be released from the elbow member housing without any contact therebetween, a transverse shaft having a longitudinal axis and supported by the elbow member housing to be substantially perpendicular to the longitudinal axis of the drive shaft of the power tool upon engagement of the elbow member housing with the power tool housing, the transverse shaft having a tool engaging end disposed externally of the elbow member housing for engaging a tool, and a face gear having gear teeth which extend substantially radially with respect to the longitudinal axis of the transverse shaft, with the face gear being mounted on the transverse shaft at a predetermined position at which the teeth of the face gear are engageable with the teeth of the pinion gear when the elbow member housing is engaged with the power tool housing.

2. An elbow attachment kit in accordance with claim 1 in which the relative positions of the pinion gear and face gear are such that the teeth of the face gear engage the teeth of the pinion gear at approximately the midspan of the face width of the pinion gear teeth upon engagement of the elbow member housing with the power tool housing.

3. An elbow attachment kit in accordance with claim 1 in which the teeth of the face gear remain engaged with the teeth of the pinion gear throughout movement of the face gear parallel to the drive shaft toward or away from the driving end of the power tool housing an amount less than one-half the face width of the pinion gear teeth.

4. An elbow attachment kit in accordance with claim 1 in which the elbow housing has a threaded portion adjacent its power tool engaging end, and the power tool housing has a complementary threaded portion adjacent its driving end, with the elbow housing being engageable with the power tool housing by threaded engagement of the respective threaded portions.

5. An elbow attachment kit in accordance with claim 1 in which the elbow member housing supports a pair of bearings disposed on either side of the face gear, with the transverse shaft supported on the pair of bearings.

6. An elbow attachment kit in accordance with claim 1 in which the elbow member housing has a split line which lies substantially midway of both the transverse shaft and pinion gear.

7. An elbow attachment kit in accordance with claim 1 in which the power tool has a conventional tool bit engaging mechanism, and the pinion gear is engageable by said conventional tool bit engaging mechanism.

8. A power tool, comprising: a power tool housing having a driving end, a drive shaft supported by the power tool housing for rotation about its longitudinal axis, with the drive shaft extending externally of the power tool housing at said driving end, a pinion gear mounted on the drive shaft at a location externally of the power tool housing and at a predetermined distance from the driving end of the housing, said pinion gear having gear teeth which extend substantially parallel with the longitudinal axis of the power tool drive shaft and have a face width of predetermined length, an elbow member housing having a power tool engaging end which is detachably engaged with the power tool housing, said elbow member housing having a housing portion surrounding the pinion gear with an opening therein sufficiently large to freely receive and allow the pinion gear to be released from the elbow member housing without any contact therebetween, a transverse shaft having a longitudinal axis and supported by the elbow member housing substantially perpendicular to the longitudinal axis of the drive shaft of the power tool, and having a tool engaging end disposed externally of the power tool housing for engaging a tool, and a face gear mounted on the transverse shaft and having gear teeth which extend substantially radially with respect to the longitudinal axis of the transverse shaft, with the face gear being disposed at a predetermined position at which the teeth of the face gear are engageable with the teeth of the pinion gear during engagement of the elbow member housing with the power tool housing.

9. A power tool in accordance with claim 8 in which the relative positions of the pinion gear and face gear are such that the teeth of the face gear engage the teeth of the pinion gear at approximately the midspan of the depth of the pinion gear teeth upon engagement of the elbow member housing with the power tool housing.

10. A power tool in accordance with claim 8 in which the teeth of the face gear remain engaged with the teeth of the pinion gear upon movement of the face gear parallel to the drive shaft toward or away from the driving end of the power tool housing.

11. A power tool in accordance with claim 8 in which the elbow housing has a threaded portion adjacent its power tool engaging end, and the power tool housing has a complementary threaded portion adjacent its driving end, with the elbow housing being detachably engaged with the power tool housing by threaded engagement of the respective threaded portions.

12. A power tool in accordance with claim 8 in which the elbow member housing supports a pair of bearings disposed on either side of the face gear, with the transverse shaft supported on the pair of bearings.

13. A power tool in accordance with claim 8 in which the elbow member housing has a split line which lies substantially midway of both the transverse sit and the pinion gear.

14. A kit for use with a power tool having a housing which supports a drive shaft which is rotary about its longitudinal axis and which protrudes externally of the power tool housing at a driving end of the housing, the kit comprising: a pinion member adapted to be mountable directly on the drive shaft externally of the power tool housing, said pinion member having gear teeth which are disposed at a predetermined distance from the driving end of the power tool housing when the pinion member is mounted to the drive shaft, an elbow member, including an elbow member housing having a power tool engaging end which is engageable with the power tool housing adjacent the driving end of the power tool housing and configured to be disposed in spaced relation from the pinion when it is mounted to the output shaft, said elbow member housing having a housing portion surrounding the pinion gear with an opening therein sufficiently large to freely receive and allow the pinion gear to be released from the elbow member housing without any contact therebetween, a transverse shaft supported by the power tool housing for rotation about its transverse shaft axis substantially perpendicular to the output shaft of the power tool, and having a tool engaging end disposed externally of the housing for engaging a selective tool, and a face gear mounted on the transverse shaft internally of the elbow member housing at a position at which it engages the teeth of the pinion when the elbow member is mounted to the power tool.

15. A right angle attachment kit for a power tool having a standard chuck with a drive axis, a housing and a drive spindle and a standard chuck projecting from the housing, comprising: a pinion gear having a mandrel adapted to be directly supported in the standard tool chuck without a bearing between the pinion gear and the tool chuck so the gear and mandrel are supported only by the tool chuck, an attachment housing having a clamp opening for attachment to the tool housing, said attachment housing having a housing portion surrounding and spaced from the pinion and mandrel throughout the length of the mandrel and pinion, said attachment housing having a housing portion surrounding the pinion gear with an opening therein sufficiently large to freely receive and allow the pinion gear to be released from the attachment housing without any contact therebetween, a transverse shaft in the attachment housing having a gear engageable with the pinion gear, and an output shaft projecting from the attachment housing driven by the transverse shaft.

16. A right angle attachment kit as defined in claim 15, wherein the pinion gear is separable from the attachment housing so it may be chucked into the tool chuck before the attachment housing is clamped to the tool housing.

17. A right angle attachment kit as defined in claim 15, wherein the pinion gear is a parallel toothed gear and the transverse shaft gear is a face gear with radial teeth whereby some axial mislocation of the attachment housing relative to the pinion gear will be accommodated.

18. A right angle attachment kit for a power tool having a tool chuck and a drive axis, a housing and a drive spindle and chuck projecting from the housing, comprising: an attachment housing having a clamp opening for attachment to the tool housing, a pinion gear adapted to be connected into the tool chuck, a transverse shaft in the attachment housing having a gear engageable with the pinion gear when mounted in the tool chuck, said attachment housing having a housing portion surrounding the pinion gear with an opening therein sufficiently large to freely receive and allow the pinion gear to be released from the attachment housing without any contact therebetween so the pinion gear may be chucked into the tool chuck before the attachment housing is clamped to the tool housing, and an output shaft projecting from the attachment housing driven by the transverse shaft.

19. A right angle attachment kit for a power tool as defined in claim 18, said pinion gear having a mandrel supported in the tool chuck solely supported in the tool chuck without any bearing between the pinion gear and the tool chuck.

20. A right angle attachment kit for a power tool having a drive axis, a housing and a drive spindle and chuck projecting from the housing, comprising: a pinion gear having a mandrel adapted to be directly supported in the tool chuck without a bearing between the pinion gear and the tool chuck, an attachment housing having a clamp opening for attachment to the tool housing, said attachment housing having a housing portion surrounding the pinion gear with an opening therein sufficiently large to freely receive and allow the pinion gear to be released from the attachment housing without any contact therebetween, a transverse shaft in the attachment housing having a gear engageable with the pinion gear, and an output shaft projecting from the attachment housing driven by the transverse shaft, the pinion gear being separable from the attachment housing so it may be chucked into the tool chuck before the attachment housing is clamped to the tool housing, and the pinion gear is a parallel toothed gear and the transverse shaft gear is a face gear with radial teeth whereby some axial mislocation of the attachment housing relative to the pinion gear will be accommodated.

\* \* \* \* \*